United States Patent Office 3,173,919
Patented Mar. 16, 1965

3,173,919
PROCESS FOR CHLORINATION OF DICHLORO-METHYLPYRIDINES TO TRICHLOROMETHYL-PYRIDINES
Howard Johnston and Frederick H. Norton, Concord, and Mary S. Tomita, Walnut Creek, Calif., assignors to The Dow Chemical Company, Midland, Mich., a corporation of Delaware
No Drawing. Filed Feb. 18, 1963, Ser. No. 259,417
6 Claims. (Cl. 260—290)

This invention relates to chlorination and more particularly to novel methods for side chain chlorination of heterocyclic compounds.

Direct chlorination, using gaseous chlorine, is a convenient preparative procedure and especially adapted to large scale synthesis. Where employable, it is a preferred method for introducing chlorine atoms into organic molecules. However, tar formation, chlorinolysis and uncontrolled nuclear chlorination or oxidation are problems associated with direct chlorination and are particularly troublesome in the pyridine series. Thus, in contrast to non-heterocyclic aromatic hydrocarbon series, the conversion of dichloromethyl group to the trichloromethyl group by direct chlorination is not a recognized process in the pyridine series. It is frequently desirable to prepare a trichloromethylpyridine compound from an available dichloromethylpyridine compound by a simple process such as direct chlorination but such has heretofore not been possible. Moreover, even the use of special reagents for introducing chlorine into organic molecules has not been taught for the conversion of dichloromethylpyridine compound to trichloromethylpyridine compound.

It has now been discovered that dichloromethylpyridine compounds may be catalytically chlorinated with chlorine gas to trichloromethylpyridine compounds in good yields, rapidly and without tar formation. It has also been discovered that 2-dichloromethylpyridine compounds may be caused to react with gaseous chlorine in the temperature range of from about 90° to 160° C. in the presence of peroxide catalyst in a liquid reaction medium to produce 2-trichloromethylpyridine compounds. It has further been discovered that 2-dichloromethylpyridine compounds may be chlorinated preferentially at the α-position to produce 2-trichloromethylpyridine compounds. In addition, it has been discovered that chlorination mixtures containing 2-dichloromethylpyridine compounds may be chlorinated to produce a mixture enriched in ring tri- and tetrachlorosubstituted 2-trichloromethylpyridine compounds. Other aspects of the present invention will become apparent from the following specification and claims.

In the process of the present invention, a composition comprising a 2-dichloromethylpyridine compound in the liquid phase is contacted with gaseous chlorine in the presence of a catalyst and at moderately elevated temperatures to obtain substantially complete conversion to a composition comprising a 2-trichloromethylpyridine compound. By the expression "a 2-dichloromethypyridine compound" as herein employed is meant a 2-dichloromethylpyridine having at least one nuclear chlorine. Preferable, the number of nuclear chlorines is from 2 to 4. The reactant 2-dichloromethylpyridine compounds may be represented by the formula

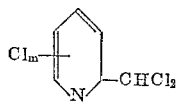

wherein $m$ is an integer of from 1 to 4, inclusive. In the preferred embodiment of the present invention, the contemplated 2 - dichloromethylpyridine compounds are 2,3,4,5-tetrachloro-2-(dichloromethyl)pyridine and 3,4,5-trichloro-2-(dichloromethyl)pyridine. Other suitable 2-dichloromethylpyridine compounds are 2,4-dichloro-2-(dichloromethyl)pyridine, 3-chloro-2-(dichloromethyl)pyridine, 5-chloro-2- (dichloromethyl)pyridine and 3,5-dichloro-2-(dichloromethyl)pyridine. By the expression "a 2-trichloromethylpyridine compound" is meant compounds which may be represented by the formula

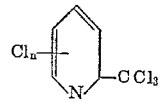

wherein $n$ is an integer of from 1 to 4, inclusive.

The process is adapted to be employed with either substantially pure 2-dichloromethylpyridine compounds or with mixtures containing either significant or major amounts of one or more of the 2-dichloromethylpyridine compounds. The temperatures suitable for carrying out this reaction are in the range of from about 90° to about 160° C.; the preferred range is from about 110° to about 130° C. The ratio of chlorine to 2-dichloromethylpyridine compound may vary from 3:1 to 15:1; the preferred ratio is from about 5:1 to 10:1. The reaction is carried out in the presence of a catalyst. For facile reaction to produce good yields of 2-trichloropyridine compounds free from tarry by-products, the catalyst employed is a peroxide catalyst. The amount of peroxide catalyst employed is that sufficient to maintain a concentration in the reaction mixture of from about 0.1 percent to about 5 percent. The preferred range is from about 0.2 percent to about 1 percent. Suitable peroxide catalysts include benzoyl peroxide, perbenzoic acid and peracetic acid. Although the novel step of direct conversion of dichloromethylpyridine compounds to trichloromethylpyridine compounds may be made to occur in the presence of actinic catalyst, the reaction is frequently slow and a practicable synthetic procedure is considered to require a peroxide catalyst. The peroxide catalyst may be employed in a dark reaction or in addition to actinic light such as ultraviolet light. Thus, for example, it has been found that addition of a peroxide to actinic light catalyzed reactions decreases reaction times to less than $\frac{1}{7}$ of that required when light alone is employed as catalyst. The reaction time may be affected by the efficiency of the apparatus and purity of starting material. Employing the conditions above set forth, the reaction is complete in from 1 to 12 hours; in most operations, the reaction is complete in from 1 to 2 hours.

The reaction is adaptable to a continuous process whereby the appropriate 2-dichloromethylpyridine compound or a chlorination mixture containing a significant amount of one or more 2-dichloromethylpyridine compounds is continuously added to a reactor whereby it is reacted therein and the desired 2-trichloromethypyridine compound or a mixture enriched in 2-trichloromethypyridine compounds is continuously withdrawn from the reaction vessel. The 2-dichloromethypyridine compound or a mixture containing a 2-dichloromethylpyridine compound may be added at a rate of from about 0.3 to 0.4 pound per hour when the reactor contains about 5 gallons of reaction mixture. The rate may be adjusted according to the scale of production as can be determined by the skilled in the art. A steady state is achieved after about one-half hour and thereafter the 2-trichloromethylpyridine composition product is continuously or periodically bled from the reactor.

A preferred embodiment of the present invention is a peroxide catalyzed reaction in the dark. In carrying out the preferred embodiment of the present invention, the peroxide catalyst is added dropwise to the reaction mixture at a rate sufficient to keep the concentration of the peroxide in the range of from about 0.2 to about 1 percent while the reaction mixture containing a 2-dichloromethylpyridine compound composition is maintained in the temperature range of from about 110° to about 130° C. for time sufficient to complete the reaction to obtain a 2-trichloromethylpyridine compound product composition. The product may be purified, if desired, by distillation or crystallization.

The following examples illustrate the invention but are not to be construed as limiting:

*Example 1*

3.9 grams (0.015 mole) of 3,4,5-trichloro-2-(dichloromethyl)pyridine (M.P. 62°–63° C.) which indicated 100 percent of said compound by vapor phase chromatographic analysis was heated in the dark to temperatures in the range of from about 104° to about 106° C. while chlorine gas was bubbled therethrough for 50 minutes. Vapor phase chromatographic analysis of the reaction mixture at the end of this period showed no change, the mixture being 100 percent 3,4,5-trichloro-2-(dichloromethyl)pyridine.

1.6 grams of benzoyl peroxide in carbon tetrachloride solution was then added in increments and chlorine gas was bubbled through the reaction mixture for 52 minutes while the temperature was maintained in the range of 105° to 113° C. As a result of these operations there was found to be 95.5 percent conversion of 3,4,5-trichloro-2-(dichloromethyl)pyridine to the desired 3,4,5-trichloro - 2 - (trichloromethyl)pyridine product. The product was crystallized from hexane to obtain 3.6 grams (80 percent yield) in a first crop of purified 3,4,5-trichloro-2-(trichloromethyl)pyridine product melting from 102.9° to 105.9° C. The product had elemental analysis as follows:

|        | Carbon | Hydrogen | Chlorine | Nitrogen |
|--------|--------|----------|----------|----------|
| Found  | 24.07  | 0.33     | 70.90    | 4.68     |
| Theory | 24.03  | 0.34     | 70.96    | 4.67     |

*Example 2*

5 pounds of a chlorination mixture was placed in a reactor and heating and irradiation of the reactor initiated. Within 10 minutes, the temperature of the reactor had reached 128° C. and at this time an initial analysis of the reactor composition was made by vapor phase chromatographic analysis. Analysis showed the composition to comprise 17.6 mole percent 3,4,5-trichloro-2-(dichloromethyl)pyridine, 31.6 mole percent 2,3,4,5-tetrachloro-6-(trichloromethyl)pyridine and 29.5 mole percent 3,4,5 - trichloro - 2 - (trichloromethyl)pyridine. Gaseous chlorine was passed into this mixture while heating in the temperature range of about 118° to about 125° C. and irradiation of the mixture was continued. Analysis of the mixture was made at intervals to determine the progress of the reaction. After about 500 minutes of reaction, the mixture was found to contain 1.5 percent 3,4,5-trichloro-2-(dichloromethyl)pyridine, 38.2 percent 2,3,4,5 - tetrachloro-6-(trichloromethyl)pyridine and 39.3 percent 3,4,5-trichloro-2-(trichloromethyl)pyridine. The results indicate a conversion of about 16 mole percent of the 3,4,5-trichloro-2-(dichloromethyl)pyridine to trichloromethylpyridine compounds.

*Example 3*

80 grams of a chlorination mixture comprising 13.2 mole percent 3,4,5-trichloro-2-(dichloromethyl)pyridine, 33.2 mole percent 2,3,4,5-tetrachloro-6-(trichloromethyl)pyridine and 34.0 mole percent 3,4,5-trichloro-2-(trichloromethyl)pyridine was placed in a reactor. Chlorine gas was introduced into and bubbled through the mixture while the mixture was irradiated with ultraviolet light and maintained in the temperature range of from about 115° to about 120° C. and while a chloroform solution of benzoyl peroxide was added at a rate of about 2.5 drops per minute. Each drop contained about 0.0002 gram of benzoyl peroxide. Vapor phase chromatographic analysis was employed to monitor the reaction. After 70 minutes, the composition contained 0 percent 3,4,5-trichloro-2-(dichloromethyl)pyridine, 37.8 mole percent 2,3,4,5-tetrachloro-6-(trichloromethyl)pyridine and 38.1 mole percent 3,4,5-trichloro-2-(trichloromethyl)pyridine, showing a 100 percent conversion of 3,4,5-trichloro-2-(dichloromethyl)pyridine and 9 mole percent increase in 2,3,4,5-tetrachloro-6-(trichloromethyl)pyridine and 3,4,5-trichloro-2-(trichloromethyl)pyridine.

*Example 4*

A sample of 2,4-dichloro-6-(dichloromethyl)pyridine was chlorinated by passing gaseous chlorine therethrough at a temperature in the range of from about 110° to 115° C. for one hour and thereafter at about 150° C. for about 4 hours while the mixture was irradiated with ultraviolet light to obtain a 2,4-dichloro-6-(trichloromethyl)pyridine product having a molecular weight of 265. 2,4-dichloro-6-(trichloromethyl)pyridine product has a boiling point of about 100°–103° C. at 1.5 millimeters of mercury pressure.

*Example 5*

1.5 grams of benzoyl peroxide in carbon tetrachloride is added dropwise and chlorine gas bubbled through 3.5 grams (0.015 mole) of 2,4-dichloro-6-(dichloromethyl)pyridine maintained at a temperature of from about 110° to 115° C. for about one hour to obtain good yields of the desired 2,4 - dichloro - 6 - (trichloromethyl)pyridine product having a molecular weight of 265.

*Example 6*

Chlorine gas was bubbled through 3.5 grams (0.015 mole) of 3,5-dichloro-2-(dichloromethyl)pyridine which was illuminated with ultraviolet light and maintained at a temperature of about 90° C. for 90 minutes to obtain a product containing 95.2 mole percent 3,5-dichloro-2-(trichloromethyl)pyridine. The product had an infrared spectra identical with a known sample having a melting point of 35.5°–36.5° C.

*Example 7*

Benzoyl peroxide in chloroform solution was added in an amount of one percent by weight of reaction mixture to 29.74 grams of a mixture of chlorinated picolines comprising 10.8 mole percent of 3,4,5-trichloro-2-(dichloromethyl)pyridine, 30.8 mole percent of 2,3,4,5-tetrachloro-6-(trichloromethyl)pyridine and 37.0 mole percent of 3,4,5-trichloro-2-(trichloromethyl)pyridine contained in a dark reactor maintained at 103° C. with gaseous chlorine bubbling therethrough. Thereafter, addition of incremental amounts of benzoyl peroxide catalyst, heating in the temperature range of from about 102° C. to 108° C. and passage of chlorine gas was continued for about 170 minutes to obtain complete (100 percent) conversion of 3,4,5-trichloro-2-(dichloromethyl)pyridine and to obtain a mixture enriched in and comprising 34.5 mole percent 2,3,4,5-tetrachloro-6-(trichloromethyl)pyridine and 41.2 mole percent 3,4,5-trichloro-2-(trichloromethyl)pyridine.

*Example 8*

In a manner similar to that described in Example 1, the following peroxide catalyzed chlorinations are carried out:

1.5 grams of benzoyl peroxide in carbon tetrachloride is added dropwise and chlorine gas bubbled through 3.5 grams (0.015 mole) of 3,5-dichloro-2-(dichloromethyl)pyridine maintained at a temperature of from about 110° to 115° C. to obtain good yields of the desired 3,5-dichloro-2-(trichloromethyl)pyridine product having a molecular weight of 265.

Chlorine gas is passed through 19.6 grams (0.1 mole) of 3-chloro-2-(dichloromethyl)pyridine (B.P. 125°–130° C./15 min. Hg) maintained in the temperature range of 115°–125° C. and in the dark while a carbon tetrachloride solution of benzoyl peroxide containing about 0.004 gram of benzoyl peroxide per milliliter is added at a rate of about 3 drops per minute to obtain good conversion to 3-chloro-2-(trichloromethyl)pyridine compound having a molecular weight of 231.

Chlorine gas is passed through 19.6 grams (0.1 mole) of 5-chloro-2-(dichloromethyl)pyridine maintained at about 120° C. in the dark while a benzoyl peroxide in carbon tetrachloride solution of above concentration is added at a rate of about 3 drops per minute to obtain good conversion to 5-chloro-2-(trichloromethyl)pyridine compound having a molecular weight of 231.

Chlorine gas is passed through 23.1 grams (0.1 mole) of 4,5-dichloro-2-(dichloromethyl)pyridine maintained at about 115° C. in the dark while a carbon tetrachloride solution of perbenzoic acid is added at a rate of about 2 drops per minute to obtain good conversion to 4,5-dichloro-2-(trichloromethyl)pyridine compound having a molecular weight of 265.

*Example 9*

In a continuous process, 1 gallon of 3,4,5-trichloro-2-(dichloromethyl)pyridine is heated and maintained in the temperature range of 115°–120° C. and a 0.4 percent benzoyl peroxide in carbon tetrachloride solution is added dropwise at a rate of several drops a minute to the reaction mixture and the reaction allowed to take place to produce 3,4,5-trichloro-2-(trichloromethyl)pyridine until no further change in composition occurs. Then a slow continuous addition of 3,4,5-trichloro-2-(dichloromethyl)-pyridine into the reaction mixture at a rate of about 0.3 pound per hour is initiated and the chlorination continued. After no further change in composition is noted, the desired 3,4,5-trichloro-2-(trichloromethyl)pyridine product having a molecular weight of 300 and a density of about 1.75 is continuously withdrawn from the reaction mixture.

*Example 10*

In a continuous process, 5 gallons of a chlorination mixture comprising about 30 mole percent 3,4,5-trichloro-2-(trichloromethyl)pyridine, 30 mole percent 2,3,4,5-tetrachloro-2-(trichloromethyl)pyridine and 15 mole percent 3,4,5-trichloro-2-(dichloromethyl)pyridine is heated and maintained in the temperature range of about 112° C. to about 122° C. while a 0.4 percent benzoyl peroxide in carbon tetrachloride solution at a rate of several drops per minute and additional chlorination mixture of the foregoing composition at a rate of 0.4 pound per hour are simultaneously and incrementally added whereupon a reaction takes place with the conversion of the 3,4,5-trichloro-2-(dichloromethyl)pyridine compound to a product composition enriched in 3,4,5-trichloro-2-(trichloromethyl)pyridine compound and 2,3,4,5-tetrachloro-2-(trichloromethyl)pyridine compound. After no further change in the composition of the reaction mixture is noted, continuous removal of the mixture enriched in trichloromethylpyridine compounds is initiated. The average density of the product composition is about 1.80.

The products produced by the process of the present invention are useful as plant growth control agents and are adapted to be employed by contacting the foliage of undesirable plants therewith to remove the undesirable plant species. In a representative operation, 25 parts by weight of a mixture comprising 3,4,5-trichloro-2-(trichloromethyl)pyridine and 2,3,4,5-tetrachloro-2-(tri-chloromethyl)pyridine, 10 parts by weight of Triton X-155 (a dimeric alkylated aryl polyether alcohol product) and 65 parts of xylene are mixed together and the resulting concentrate composition subsequently dispersed in water to produce a spray composition containing about 18 pounds of the pyridine compounds per 100 gallons of spray mixture. The spray mixture is applied to foliage of pigweed, lamb's-quarters, foxtail, purslane and other weeds at a dosage of 100 gallons per acre to completely destroy said undesirable species.

The dichloromethyl)pyridine reactants to be employed in the process of the present invention may be obtained by an anhydrous photochemical chlorination of α-picoline at temperatures of from about 110°–130° C. followed by careful fractional distillation of the chlorination mixture. The reactants may also be obtained by the stannous chloride reduction of the corresponding trichloromethylpyridine compound by refluxing the latter with stannous chloride in a solvent such as acetone for several hours, cooling and recrystallizing the dichloromethylpyridine compound from a hydrocarbon solvent such as hexane. 2,4-dichloro-2-(dichloromethyl)pyridine may be prepared through a sequence of reactions whereby dehydroacetic acid is refluxed with 90 percent sulfuric acid to produce 2-hydroxy-6-methylpyrone, followed by heating the latter at about 100° C. in a closed vessel with aqueous ammonia at autogenous pressure to obtain 2,4-dihydroxy-6-methylpyridine, reacting the latter with phosphorus oxychloride in the temperature range of about 93° to 120° C. to obtain 2,4-dichloro-6-methylpyridine, reacting the latter with excess anhydrous hydrogen chloride to form a complex and thereafter reacting with chlorine to obtain the desired 2,4-dichloro-6-(dichloromethyl)pyridine.

We claim:

1. A process for preferentially converting a composition comprising a dichloromethylpyridine compound having at least one ring chlorine substituent to a trichloromethylpyridine compound having at least one ring chlorine substituent which comprises intimately contacting said dichloromethylpyridine compound with excess gaseous chlorine at temperatures in the range of from about 90° C. to about 160° C. in the presence of a peroxide catalyst, and wherein the process is carried out in the absence of added water.

2. A process for preparing a composition comprising a 2-trichloromethylpyridine compound represented by the formula

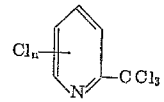

wherein $n$ is an integer of from 1 to 4, inclusive, from a composition comprising a corresponding 2-dichloromethylpyridine compound having the formula

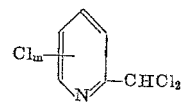

wherein $m$ is an integer of from 1 to 4, inclusive, which comprises bubbling through and intimately contacting with said 2-dichloromethylpyridine compound, excess gaseous chlorine at temperatures in the range of from about 90° C. to about 160° C. in the presence of a catalyst selected from the group consisting of (a) an actinic catalyst and (b) a peroxide catalyst, and wherein the process is carried out in the absence of added water.

3. A process for preparing a composition comprising a 2-trichloromethylpyridine compound represented by the formula

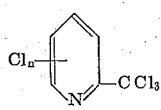

wherein $n$ is an integer of from 1 to 4, inclusive, from a composition comprising a corresponding 2-dichloromethylpyridine compound having the formula

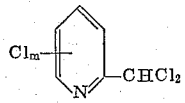

wherein $m$ is an integer of from 1 to 4, inclusive, which comprises bubbling through and intimately contacting with said 2-dichloromethylpyridine compound, excess gaseous chlorine at temperatures in the range of from about 90° C. to about 160° C. in the presence of a peroxide catalyst, and wherein the process is carried out in the absence of added water.

4. A process for preparing 3,4,5-trichloro-2-(trichloromethyl)pyridine from 3,4,5-trichloro-2-(dichloromethyl)pyridine, which comprises bubbling through and intimately contacting with said 3,4,5-trichloro-2-(dichloromethyl)pyridine, excess gaseous chlorine at temperatures in the range of from about 90° C. to about 160° C. in the presence of a catalyst selected from the group consisting of (a) an actinic catalyst and (b) a peroxide catalyst, and wherein the process is carried out in the absence of added water.

5. A process for preparing 3,4,5-trichloro-2-(trichloromethyl)pyridine from 3,4,5-trichloro-2-(dichloromethyl)pyridine which comprises bubbling through and intimately contacting with said 3,4,5-trichloro-2-(dichloromethyl)-pyridine, excess gaseous chlorine at temperatures in the range of from about 90° C. to about 160° C. in the presence of a peroxide catalyst, and wherein the process is carried out in the absence of added water.

6. A continuous process for producing a composition comprising a 2-trichloromethylpyridine compound having the formula

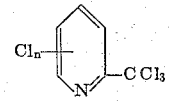

wherein $n$ is an integer of from 1 to 4, inclusive, from a composition comprising a corresponding 2-dichloromethylpyridine compound having the formula

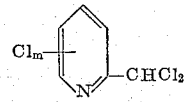

wherein $m$ is an integer of from 1 to 4, inclusive, which comprises
  (1) continuously feeding said composition comprising 2-dichloromethylpyridine compound into a heated reactor maintained at temperatures in the range of from about 90° C. to about 160° C.,
  (2) continuously feeding excess gaseous chlorine into said heated reactor,
  (3) continuously feeding a peroxide catalyst into said heated reactor, and
  (4) intimately contacting in the reactor said composition comprising 2-dichloromethylpyridine compound with gaseous chlorine in the presence of said catalyst and wherein the process is carried out in the absence of added water.

References Cited in the file of this patent
UNITED STATES PATENTS
2,679,453    Brett et al. _____ May 25, 1954
OTHER REFERENCES
Cram et al.: "Organic Chemistry," published by McGraw-Hill Publishing Co., 1959, p. 418.